UNITED STATES PATENT OFFICE.

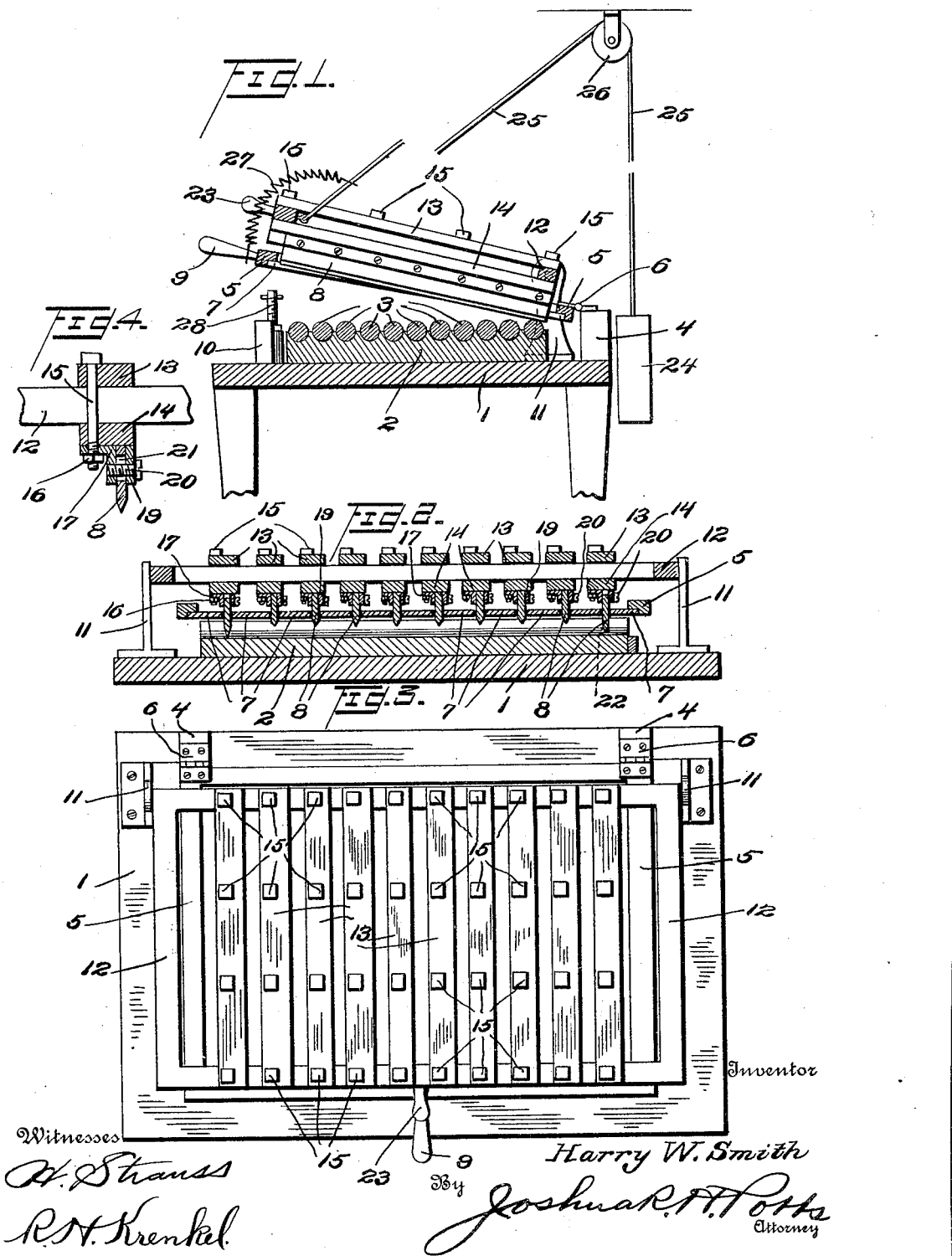

HARRY W. SMITH, OF WEST CHESTER, PENNSYLVANIA.

CRAYON-CUTTER.

1,131,431.  Specification of Letters Patent.  Patented Mar. 9, 1915.

Application filed April 16, 1912. Serial No. 691,190.

*To all whom it may concern:*

Be it known that I, HARRY W. SMITH, a citizen of the United States, residing at West Chester, in the county of Chester and State of Pennsylvania, have invented certain new and useful Improvements in Crayon-Cutters, of which the following is a specification.

My invention relates to improvements in crayon cutters, the object of the invention being to provide a device of this character which is especially adapted for cutting or weakening the plastic sticks at regular intervals, so that said sticks when dried may be readily broken into crayons of uniform length.

A further object is to provide a crayon cutter with an improved slat frame through which the knives of the cutter are projected into the crayon sticks, said frame serving to prevent any upward movement of the sticks on the cutters, and insuring a uniform operation of the device.

With these and other objects in view, the invention consists in certain novel features of construction and combinations and arrangements of parts as will be more fully hereinafter described and pointed out in the claims.

In the accompanying drawings: Figure 1, is a view in transverse section illustrating my improvements. Fig. 2, is a view in longitudinal section showing the cutter in its cutting position. Fig. 3, is a plan view of the structure shown in Fig. 2, and Fig. 4, is a view in section on an enlarged scale through one of the cutting blades and its mounting.

1, represents a table or support adapted to receive the grooved parts 2 containing plastic sticks 3 from which the crayons are made. Blocks 4 are secured on the table at its rear, and to these blocks a slat frame 5 is connected by hinges 6. The slat frame 5 is of rectangular form, and is provided with a series of relatively thin slats 7, and these slats are spaced apart a distance but slightly greater than the thickness of the blades 8, which will be hereinafter described. This slat frame is provided at its forward edge with a handle 9 to facilitate its downward movement, and this downward movement is limited by blocks 10 on the table, so that the slat frame will always be properly positioned with its slats just above the upper edge of the sticks 3. Brackets 11 are also secured on the table, and to these brackets a cutter frame 12 is pivotally connected, providing a hinge mounting for the cutter frame. This cutter frame is rectangular, and the longitudinal members of the same are connected by parallel bars 13 and 14, the former located above the frame, and the latter below the frame, and these bars are securely clamped to the cutter frame by bolts 15 and nuts 16. These bolts 15 also project through angle bars 17 on the lower face of bars 14, and against these angle bars 17, blades 8 are secured. These blades 8 are positioned between strips 19, and the angle bars 17 and headed screws 20 are projected through openings in the strips 19 through slots 21 in the blades 8, and are screwed into the angle bars 17, so that the blades may be securely clamped and by reason of the slots 21, these blades may be positioned at the proper vertical adjustment to perform the work desired. As a matter of fact, the end blades 8 project appreciably below the intermediate blades as they cut entirely through the sticks 3. To permit this action, the parts 2 have transverse grooves 22 adjacent their ends to receive the cutters. The cutter frame 12 is provided at its front edge with a handle 23, and this cutter frame is connected to a weight 24 by means of a flexible cord 25, the latter being passed over a pulley 26 supported from the ceiling, so that the weight 24 slightly overbalances the weight of the cutter, and normally holds the same in elevated position.

A coiled spring 27 connects the handle 9 with the flexible cord 25, so that the slat frame 5 is also normally elevated. This permits the slat frame to be lowered in advance of the cutter frame, and to limit the downward movement of the cutter frame, vertically adjustable screw-threaded posts 28 are provided on the table 1, against which the cutter frame engages.

In operation, the board containing the plastic sticks is placed in position on table 1, the slat frame is then lowered, and then the cutter frame is lowered. The end blades will cut entirely through the plastic sticks, and the surplus at the ends of the boards will be thrown off and used over again. The intermediate cutters will cut only part way through the sticks, in fact, they will merely nick the sticks so as to weaken them, and they may be conveniently broken at these weakened points when dry.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. A crayon cutter comprising a support adapted to receive the sticks of plastic material thereon, a hinged slat frame adapted to be positioned over the sticks, a hinged cutter frame, and a series of blades on the cutter frame movable between the slats of the slat frame and adapted to cut into the plastic sticks, the end blades adapted to cut deeper than the intermediate blades, substantially as described.

2. A crayon cutter comprising a support adapted to receive the sticks of plastic material thereon, a hinged slat frame adapted to be positioned over the sticks, a hinged cutter frame longer than the slat frame and positioned above the same, blades on the cutter frame movable between the slats of the slat frame and adapted to cut into the plastic sticks, said cutter comprising a plurality of parallel blades, the end blades projected beyond the plane of the cutting edges of the intermediate blades, whereby the end blades only sever the sticks, substantially as described.

3. A crayon cutter comprising a support adapted to receive the sticks of plastic material thereon, a hinged slat frame adapted to be positioned over the sticks, a hinged cutter frame, blades on the cutter frame movable between the slats of the slat frame and adapted to cut into the plastic sticks, a weight, a pulley, a flexible cord connecting the cutter frame with the weight and passed over the pulley, and a spring connecting said flexible cord with the slat frame, substantially as described.

4. A crayon cutter comprising a support adapted to receive the sticks of plastic material thereon, a hinged slat frame adapted to be positioned over the sticks, a hinged cutter frame, blades on the cutter frame movable between the slats of the slat frame and adapted to cut into the plastic sticks, said cutter comprising a plurality of parallel blades, the end blades projected beyond the plane of the cutting edges of the intermediate blades, whereby the end blades only sever the sticks, a weight, a pulley, a flexible cord connecting the cutter frame with the weight and passed over the pulley, and a spring connecting said flexible cord with the slat frame, substantially as described.

5. A crayon cutter comprising a support adapted to receive the sticks of plastic material thereon, a hinged slat frame adapted to be positioned over the sticks, a hinged cutter frame longer than the slat frame and positioned above the same, a series of blades on the cutter frame movable between the slats of the slat frame and adapted to cut into the plastic sticks, the end blades adapted to cut deeper than the intermediate blades, means for limiting the downward movement of the slat frame, and means for limiting the downward movement of the cutter frame, substantially as described.

6. A crayon cutter comprising a support adapted to receive the sticks of plastic material thereon, a hinged slat frame adapted to be positioned over the sticks, a hinged cutter frame, blades on the cutter frame movable between the slats of the slat frame and adapted to cut into the plastic sticks, said cutter comprising a plurality of parallel blades, the end blades projected beyond the plane of the cutting edges of the intermediate blades, whereby the end blades only sever the sticks, means for limiting the downward movement of the slat frame, and means for limiting the downward movement of the cutter frame, substantially as described.

7. A crayon cutter comprising a rectangular frame, parallel bars positioned above and below the frame, angle bars located against the lower face of the lower bars, bolts projected through all of said bars, nuts on said bolts clamping the bars together and to the said frame, blades positioned against the angle bars and having slots therein, strips positioned against the blades, and screws projected through the strips, through the slots, in the blades, and screwed into the angle bars, substantially as described.

8. A crayon cutter comprising means for supporting crayons, means for holding the crayons down upon the support, a frame movable upon the crayons, and a series of blades supported on the frame, the end blades adapted to cut deeper than the intermediate blades, substantially as described.

9. A crayon cutter comprising means for supporting crayons, means for holding the crayons down upon the support, a frame movable upon the crayons, a series of blades supported on the frame, the end blades adapted to cut deeper than the intermediate blades, and means normally holding said frame in elevated position, substantially as described.

In testimony whereof I have signed my name to this specification in the presence of two subscribing witnesses.

HARRY W. SMITH.

Witnesses:
ARTHUR T. PAINE,
EDITH H. RUSSELL.

Copies of this patent may be obtained for five cents each, by addressing the "Commissioner of Patents, Washington, D. C."